(12) United States Patent
Rosenberg et al.

(10) Patent No.: US 10,380,630 B2
(45) Date of Patent: *Aug. 13, 2019

(54) METHOD AND SYSTEM FOR DYNAMIC AD PLACEMENT

(71) Applicant: The DIRECTV Group, Inc., El Segundo, CA (US)

(72) Inventors: Scott A. Rosenberg, Glen Ridge, NJ (US); Matthew H. Self, Emerald Hills, CA (US)

(73) Assignee: THE DIRECTV Group, Inc., El Segundo, CA (US)

( * ) Notice: Subject to any disclaimer, the term of this patent is extended or adjusted under 35 U.S.C. 154(b) by 1205 days.

This patent is subject to a terminal disclaimer.

(21) Appl. No.: 14/058,393

(22) Filed: Oct. 21, 2013

(65) Prior Publication Data

US 2014/0108138 A1    Apr. 17, 2014

Related U.S. Application Data

(63) Continuation of application No. 09/978,144, filed on Oct. 15, 2001, now Pat. No. 8,571,934.

(Continued)

(51) Int. Cl.
*G06Q 30/00* (2012.01)
*G06Q 30/02* (2012.01)
(Continued)

(52) U.S. Cl.
CPC ..... *G06Q 30/0251* (2013.01); *G06Q 30/0241* (2013.01); *G06Q 30/0264* (2013.01);
(Continued)

(58) Field of Classification Search
CPC .......... G06Q 30/0264; G06Q 30/0241; G06Q 30/0251
(Continued)

(56) References Cited

U.S. PATENT DOCUMENTS

| 5,272,525 A | 12/1993 | Borchardt et al. |
| 5,333,091 A | 7/1994 | McFarland et al. |

(Continued)

FOREIGN PATENT DOCUMENTS

| AU | 694568 B2 | 7/1998 |
| DE | 19939410 A1 | 3/2001 |

(Continued)

OTHER PUBLICATIONS

AdServer Software Solution, The Platform for Tomorrow Built on a Flexible, Extensible Business Object Framework, downloaded from the World Wide Web at http://www.doubleclick.net/ on Oct. 28, 2000.

(Continued)

*Primary Examiner* — Michael Bekerman
(74) *Attorney, Agent, or Firm* — Guntin & Gust, PLC; Mark Wilinski

(57) ABSTRACT

A system and method for placing ads on a client-side video replay system. The described embodiments of the present invention allow a client to make a determination of ad placement priority separately from the function of serving ads to a requesting application. A described dynamic ad placement engine reorders ads when the context of the system is changed to yield a next ad to be placed. Thus, at a later time, when an application sends an ad request, the dynamic ad placement engine can quickly respond with the ad to be placed. The ads also are preferably reordered after an ad is placed. Placement of ads is controlled in the described embodiment by interpreted rules for each ad.

20 Claims, 9 Drawing Sheets

Related U.S. Application Data

(60) Provisional application No. 60/240,715, filed on Oct. 15, 2000, provisional application No. 60/240,714, filed on Oct. 15, 2000.

(51) Int. Cl.

| | |
|---|---|
| *G11B 27/036* | (2006.01) |
| *H04N 7/16* | (2011.01) |
| *H04N 7/173* | (2011.01) |
| *H04N 9/82* | (2006.01) |
| *H04N 21/258* | (2011.01) |
| *H04N 21/262* | (2011.01) |
| *H04N 21/4147* | (2011.01) |
| *H04N 21/431* | (2011.01) |
| *H04N 21/433* | (2011.01) |
| *H04N 21/442* | (2011.01) |
| *H04N 21/45* | (2011.01) |
| *H04N 21/454* | (2011.01) |
| *H04N 21/458* | (2011.01) |
| *H04N 21/462* | (2011.01) |
| *H04N 21/81* | (2011.01) |
| *H04N 21/8355* | (2011.01) |
| *G11B 27/032* | (2006.01) |
| *G11B 27/034* | (2006.01) |

(52) U.S. Cl.
CPC ..... *G06Q 30/0269* (2013.01); *G06Q 30/0277* (2013.01); *G11B 27/036* (2013.01); *H04N 7/165* (2013.01); *H04N 7/17318* (2013.01); *H04N 7/17327* (2013.01); *H04N 9/8227* (2013.01); *H04N 21/25891* (2013.01); *H04N 21/26283* (2013.01); *H04N 21/4147* (2013.01); *H04N 21/4312* (2013.01); *H04N 21/4314* (2013.01); *H04N 21/4331* (2013.01); *H04N 21/4333* (2013.01); *H04N 21/4334* (2013.01); *H04N 21/44222* (2013.01); *H04N 21/454* (2013.01); *H04N 21/458* (2013.01); *H04N 21/4532* (2013.01); *H04N 21/4622* (2013.01); *H04N 21/812* (2013.01); *H04N 21/8355* (2013.01); *G11B 27/032* (2013.01); *G11B 27/034* (2013.01)

(58) Field of Classification Search
USPC .................. 705/14.61, 14.4, 14.49
See application file for complete search history.

(56) References Cited

U.S. PATENT DOCUMENTS

| | | | |
|---|---|---|---|
| 5,455,630 A | 10/1995 | McFarland et al. | |
| 5,543,743 A | 8/1996 | Cooper et al. | |
| 5,600,366 A | 2/1997 | Schulman | |
| 5,610,653 A | 3/1997 | Abecassis | |
| 5,652,615 A | 7/1997 | Bryant et al. | |
| 5,661,516 A | 8/1997 | Carles | |
| 5,664,948 A | 9/1997 | Park et al. | |
| 5,692,093 A | 11/1997 | Debs et al. | |
| 5,696,866 A | 12/1997 | McFarland et al. | |
| 5,708,776 A | 1/1998 | Kikinis | |
| 5,740,549 A | 4/1998 | Hassett et al. | |
| 5,758,257 A | 5/1998 | Herz | |
| 5,774,170 A | 6/1998 | Hite et al. | |
| 5,781,228 A | 7/1998 | Sposato | |
| 5,826,168 A | 10/1998 | Inoue et al. | |
| 5,848,397 A * | 12/1998 | Marsh .................. | G06Q 10/107 705/14.61 |
| 5,850,218 A | 12/1998 | Lajoie | |
| 5,884,141 A | 3/1999 | Inoue et al. | |
| 5,886,731 A | 3/1999 | Ebisawa et al. | |
| 5,948,061 A * | 9/1999 | Merriman .............. | G06Q 30/02 705/14.53 |
| 5,959,621 A | 9/1999 | Nawaz et al. | |
| 5,987,210 A | 11/1999 | McFarland et al. | |
| 5,995,092 A | 11/1999 | Yuen et al. | |
| 5,999,688 A | 12/1999 | McFarland et al. | |
| 6,039,574 A | 3/2000 | Standiford et al. | |
| 6,108,484 A | 8/2000 | Shin et al. | |
| 6,215,526 B1 | 4/2001 | Barton et al. | |
| 6,233,389 B1 | 5/2001 | Barton et al. | |
| 6,286,005 B1 * | 9/2001 | Cannon .................. | G06Q 30/02 455/2.01 |
| 6,310,886 B1 | 10/2001 | Barton et al. | |
| 6,324,338 B1 | 11/2001 | Wood et al. | |
| 6,327,418 B1 | 12/2001 | Barton et al. | |
| 6,332,127 B1 | 12/2001 | Gopal et al. | |
| 6,349,410 B1 | 2/2002 | Lortz | |
| 6,360,053 B1 | 3/2002 | Wood et al. | |
| 6,452,612 B1 | 9/2002 | Holtz et al. | |
| 7,017,173 B1 * | 3/2006 | Armstrong ............. | H04N 5/445 348/E5.099 |
| 7,039,933 B1 | 5/2006 | Chen et al. | |
| 7,225,142 B1 | 5/2007 | Roesler et al. | |
| 7,337,456 B1 | 2/2008 | Nihei et al. | |
| 2001/0049820 A1 | 12/2001 | Barton et al. | |
| 2002/0036655 A1 | 3/2002 | Yulevich et al. | |
| 2002/0072972 A1 | 6/2002 | Lamont et al. | |
| 2002/0083439 A1 * | 6/2002 | Eldering ................ | G06Q 30/02 725/32 |
| 2002/0090198 A1 | 7/2002 | Rosenberg et al. | |
| 2002/0100041 A1 | 7/2002 | Rosenberg et al. | |
| 2003/0037068 A1 | 2/2003 | Thomas et al. | |
| 2003/0195797 A1 | 10/2003 | Klug et al. | |
| 2005/0267994 A1 * | 12/2005 | Wong .................... | H04N 5/765 709/246 |

FOREIGN PATENT DOCUMENTS

| | | |
|---|---|---|
| EP | 0693215 B1 | 11/1998 |
| EP | 0917060 | 5/1999 |
| EP | 1071287 A2 | 1/2001 |
| WO | WO1996/008921 | 3/1996 |
| WO | WO1997/031315 | 8/1997 |
| WO | WO1998/051076 | 11/1998 |
| WO | WO 98/59493 | 12/1998 |
| WO | 99/04561 | 1/1999 |
| WO | WO 99/04561 | 1/1999 |
| WO | 99/52279 | 10/1999 |
| WO | WO 99/52279 | 10/1999 |
| WO | WO 99/52285 | 10/1999 |
| WO | 0007368 A1 | 2/2000 |
| WO | WO 00/07368 | 2/2000 |
| WO | 0018108 A2 | 3/2000 |
| WO | WO 00/18108 | 3/2000 |
| WO | 0028736 A1 | 5/2000 |
| WO | WO00/28736 A1 | 5/2000 |
| WO | 0044171 A1 | 7/2000 |
| WO | WO 00/44171 | 7/2000 |
| WO | 0056072 A1 | 9/2000 |
| WO | WO 00/56072 | 9/2000 |
| WO | 0058833 A1 | 10/2000 |
| WO | 0058834 A1 | 10/2000 |
| WO | 0058967 A1 | 10/2000 |
| WO | 0059214 A1 | 10/2000 |
| WO | 0062298 A1 | 10/2000 |
| WO | 0062299 A1 | 10/2000 |
| WO | 0062533 A1 | 10/2000 |
| WO | WO00/58833 | 10/2000 |
| WO | WO00/58834 | 10/2000 |
| WO | WO 00/58967 | 10/2000 |
| WO | WO 00/59214 | 10/2000 |
| WO | WO 00/62299 | 10/2000 |
| WO | 0067475 A1 | 11/2000 |
| WO | 0106370 A1 | 1/2001 |
| WO | 0122729 A1 | 3/2001 |
| WO | 0146843 A2 | 6/2001 |
| WO | 0147238 A2 | 6/2001 |
| WO | 0147279 A2 | 6/2001 |

(56) References Cited

FOREIGN PATENT DOCUMENTS

| | | | |
|---|---|---|---|
| WO | 0165762 | A2 | 9/2001 |
| WO | 0165862 | A2 | 9/2001 |
| WO | 0176249 | A1 | 10/2001 |
| WO | 0189203 | A2 | 11/2001 |
| WO | 0147249 | B1 | 2/2002 |
| WO | 0233973 | A2 | 4/2002 |
| WO | 0233975 | A2 | 4/2002 |
| WO | 02056577 | A2 | 7/2002 |

OTHER PUBLICATIONS

CNN.com [online], retrieved from the World Wide Web at URL: http//www.cnn.com/ on Dec. 6, 2001.
European Patent Office, International Search Report for International (PCT) Application No. PCT/USOI/32169, dated Jul. 7, 2002, 4 pages.

* cited by examiner

```
<val name="ad_adid" type="value32">1025</val>
<val name="ad_rev" type="value32">0</val>
<val name="ad_type" type="string">pause</val>
<val name="ad_pools" type="string">9002</val>
<val name="ad_files" type="string">"bmp/1025.bmp"</val>
<val name="ad_triggers" type="string">"g_tod"</val>
<val name="ad_genre" type="string" />
<val name="exp_placement" type="string">(((g_time>=968630400)&&
    ((79200<=g_tod)||(g_tod<=75540)))&&((((g_time-l_last_time)>= 18000) &&((g_occs-
    l_last_occ)>=1))</val>
<val name="exp_expired" type="string">((l_occs>=50)||(g_time>=969580800))</val>
<val name="exp_weight" type="string">40</val>
<val name="exp_weight2" type="string">16777215-l_last_occ</val>
<val name="exp_winner" type="string">"bmp/1025.bmp"</val>
<val name="stmt_winner_update" type="string">l_occs=l_occs+1;
    l_last_time=g_time;l_last_occ=g_occs</val>
<val name="exp_winner_log" type="string">print g_programtitle</val>
<val name="ad_preserve_list" type="string">"l_occs" , "l_last_time" , "l_last_occ"</val>
<val name="l_occs" type="value32">0</val>
<val name="l_last_time" type="value32">0</val>
<val name="l_last_occ" type="value32">0</val>
```

Fig. 5

Example control info (one parameter set per ad)

| Parameter name | Parameter type | Example value | Description |
|---|---|---|---|
| g_occs | integer | 100 | Count of total ad occurrences that have ever been placed on this system. |
| g_lastad | integer | 1045 | Identifier of last ad to be placed on system. |
| g_lastad_time | integer | 969300900 | Time in epoch seconds of last ad placement. |
| g_time | integer | 969394500 | Current time in epoch seconds (only updated every 15 minutes.) |
| g_dow | integer | 2 | Current day of week (Monday = 1.) |
| g_dom | integer | 25 | Current day of month (begins with 1.) |
| g_doy | integer | 156 | Current day of year (begins with 1.) |
| g_month | integer | 4 | Current month of year (January = 1.) |
| g_year | integer | 2001 | Current Identification #s |
| g_tod | integer | 47700 | Time of Day in Seconds, 0-86399 |
| g_ad_pools | string | [1411,5013, 4] | List of s numbers associated with current viewing program. |
| g_channelid | integer | 10672 | Unique TMS channel ID. |
| g_programstart | integer | 969391800 | Time in epoch seconds that current viewing program b  ad engine |
| g_programtitle | string | Judge Judy | Name of current program |

602 — Global: rows g_occs through g_year. Context: rows g_tod through g_programtitle.

Fig. 6

Example global and context parameters

| Parameter | Parameter Type | Value |
|---|---|---|
| ad-adid | value32 | 1025 |
| ad_rev | value32 | 0 |
| ad_type | string | pause |
| ad_pools | string | 9002 |
| ad_files | string | bmp/1025.bmp |
| ...... | | ...... |

702

Example ad control info
(one ad control table per ad)

| Trigger Parameter | Ad-ID |
|---|---|
| g-TOD | 1025, 1033, 45, ... |
| ...... | ...... |

712

Example trigger info
(not all ads have triggers)

Heap (top of heap is next ad to be placed)

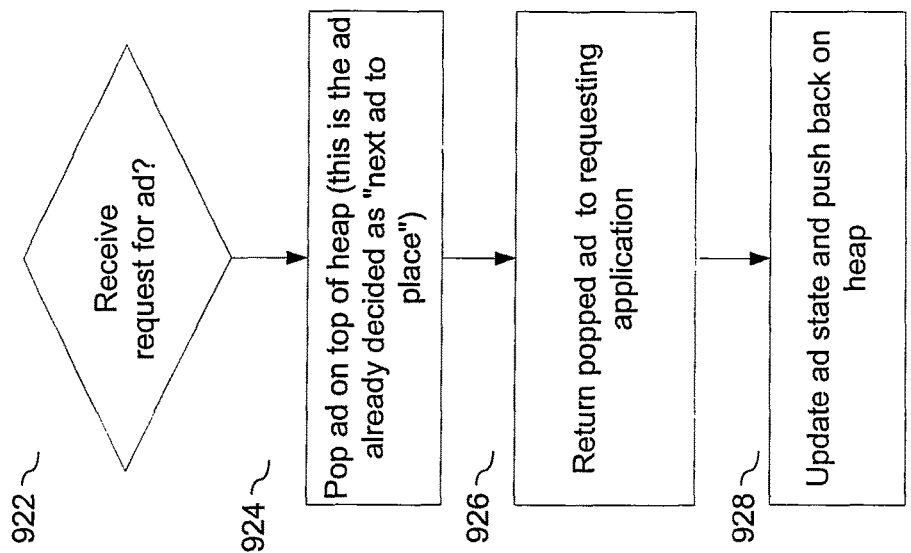
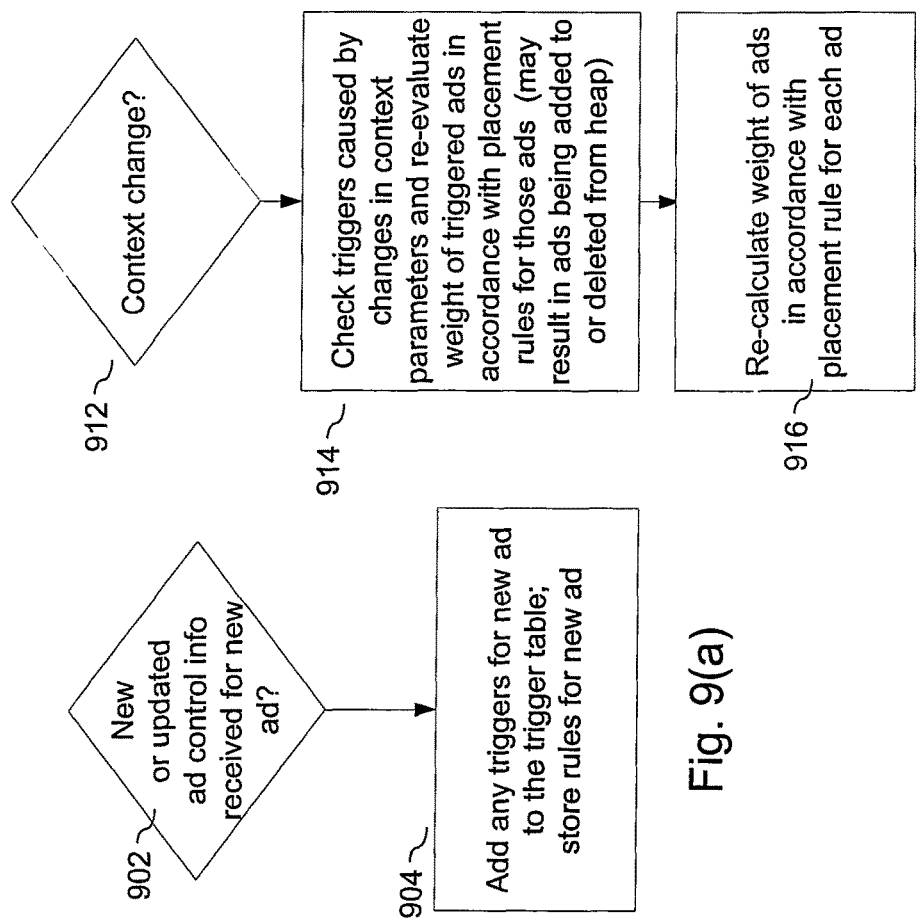

METHOD AND SYSTEM FOR DYNAMIC AD PLACEMENT

RELATED APPLICATIONS

This application is a continuation application of U.S. patent application Ser. No. 09/978,144, filed Oct. 15, 2001. U.S. patent application Ser. No. 09/178,144 claims priority under 35 U.S.C. § 119(e) to both U.S. Provisional Application No. 60/240,715, filed Oct. 15, 2000, and entitled "Method and System for Dynamic Ad Placement," and U.S. Provisional Application No. 60/240,714, filed Oct. 15, 2000, and entitled "Method and System for Pause Ads," both of which are incorporated by reference herein in their entirety. U.S. patent application Ser. No. 09/178,144 is also incorporated by reference herein.

TECHNICAL FIELD

The present invention relates generally to video data recorders and, more specifically, to a method and system for determining and playing ads in video data recorders.

BACKGROUND OF THE INVENTION

Advertisers have long tried to make sure that the right people are watching their advertisements. Television advertisers spend large amounts of money trying to make sure their advertisements ("ads") are aired during television shows having the proper demographics. Thus, television advertisers attempt to match the ad to the demographics of the audience for particular television programs, purchasing advertising slots for those television programs that they hope will attract the proper audience for their ads. Unfortunately, there is no way for the advertisers to know in real time whether people are watching their ads or whether the ads are reaching the targeted demographic groups. Similarly, there is no way for television advertisers to determine the viewing patterns of individual viewers or to target ads to individual viewers since the same ads are broadcast to everyone watching a particular program.

Advertisers on the Internet have been targeting their ads for several years. An Internet advertiser can currently register for an ad-serving service, which attempts to distribute the advertiser's ads to users who will be receptive to the ads. To view a web page on the Internet, a user enters the URL of the web page or clicks on a link to the web page. The web page itself is fetched from the appropriate web server, and an ad is fetched from the ad service. The ad service attempts to determine which ad to send to the user based on which web page the user has requested and on various other factors known about the user (such as, for example, information about the user gleaned from cookies or from user registration procedures). Because the ad service is located on the server side, the ad service generally relies on one-size-fits-all rules to determine which ads to display for a particular page request. Because the ad selection process is centrally located, performance requirements often necessitate a simplification of the logic used to select an ad.

In addition, an Internet ad service is "coupled" to the user request. An Internet ad server bases the ad it serves, at least partly, on the URL of the requested web page. It is also important to note that the Internet ad server needs to send an ad to the user as quickly as possible, because the user is expecting to receive the requested web page (along with any other third party content, such as ads) as soon as possible. The fact that the typical Internet ad server is time-constrained makes it more difficult for the ad server to perform elaborate methods to determine which ads to send. Overcoming this problem typically requires the use of very high-end computers to serve the ads.

Ultimately, Internet ad serving solutions are request-based. That is, an ad is served from the central server in response to a request. Because many requests are fulfilled in parallel, ads for competing products may be served for each of the separate requests. While in theory the server could track ads being served to each client and eliminate the serving of two competing ads to the same client, the centralized ad serving environment, with millions of users and with ad serving distributed over many actual servers, makes this extremely difficult.

Moreover, an Internet ad server needs to be in substantially constant communication with the Internet, since ad requests are received constantly. Such a system was not designed to work in situations where the ad receiving client is only intermittently connected to the Internet.

What is needed is a way to deliver ads to receptive audiences where there is ample time to determine who might be the best target for each particular ad and where the decision is sensitive to the context in which the ad request was made. Lastly, it is desirable to be able to place ads extremely quickly for each individual user.

SUMMARY OF THE INVENTION

The described embodiments of the present invention decouple the ad selection process from the user's request for content. It should be understood that the intended invention can be employed in a variety of devices, such as video data recorders and set-top boxes, where the device is not in continuous communication with an initial ad source.

The context in which the described embodiment operates is an individual user's video replay system, although the invention is not intended to be limited to video replay systems. In a video replay system, a user selects program content by replaying previously "taped" content from a hard drive or similar storage medium or by turning on his television (or other content source) and selecting a program or show to watch. In the latter case, the selected program content is received by the replay system, it is first stored on the storage medium and then displayed on a display device such as a television set or monitor. A dynamic ad placement engine of a preferred embodiment preferably operates within the video replay system and needs to select ads only for a single video replay system. The ad placement engine in a particular video replay system always selects ad content for that video replay system and does not have to spend time trying to determine the identity and preferences of every possible viewer of the content since only a very small subset of viewers watch content on a particular video replay system.

In the described embodiment, the device containing the dynamic ad placement engine is not necessarily always in communication with an initial source of ads. For example, an ad source might communicate with a video replay system periodically, such as once a day or several times a week, either at a set time or in response to an instruction or query, to obtain information about ads that may be displayed on the device.

Additionally, in the described embodiment, a dynamic ad placement engine knows about the current context of the system before an ad request is received. In the described embodiment, the ad selection process is "decoupled" from the ad content delivery process. Various software applications in the video replay system can determine at which times and under which circumstances they desire to display ads. The applications do not necessarily rely on whether the user has changed the content being viewed to determine when to request and display ads. This system is CPU-efficient and allows ads to be evaluated "at leisure" before they are served.

The described embodiments of the present invention do not select ads for placement at the time that the user selects his viewing content. Instead, the described embodiment of the present invention allows the user to select content as a separate function. Ad selection is not performed at the time of user content selection, but instead, is asynchronous to the user's actions in selecting programming to watch. Thus, the ad selection engine gains evaluation time to make a more informed decision about which ad show be displayed next by the video replay system.

BRIEF DESCRIPTION OF THE DRAWINGS

FIG. 5 is an example set of rules that comprise an ad control file.

FIG. 6 shows examples of types of ad parameters.

FIG. 9(a) shows a flowchart of a method performed when a new ad control file is received from the server.

FIG. 9(b) shows a flowchart of a method performed when a context update occurs.

FIG. 9(c) is a flow chart showing a method for selecting an ad in response to an ad request.

DETAILED DESCRIPTION OF PREFERRED EMBODIMENTS

Embodiments of the present invention are now described with reference to the figures where like reference numbers indicate identical or functionally similar elements.

The described embodiment contains a dynamic ad placement engine as one component in an advertising system. The described advertising system is preferably located in a device, such as a video replay system, (for example, a video replay system sold by ReplayTV, Inc. of Mountain View, Calif.), although the present invention can be used with other devices, including other video replay systems, including but not limited to interactive TV, set-top applications and devices, and handheld video players.

1. Example Video Replay System

Figure 1A:
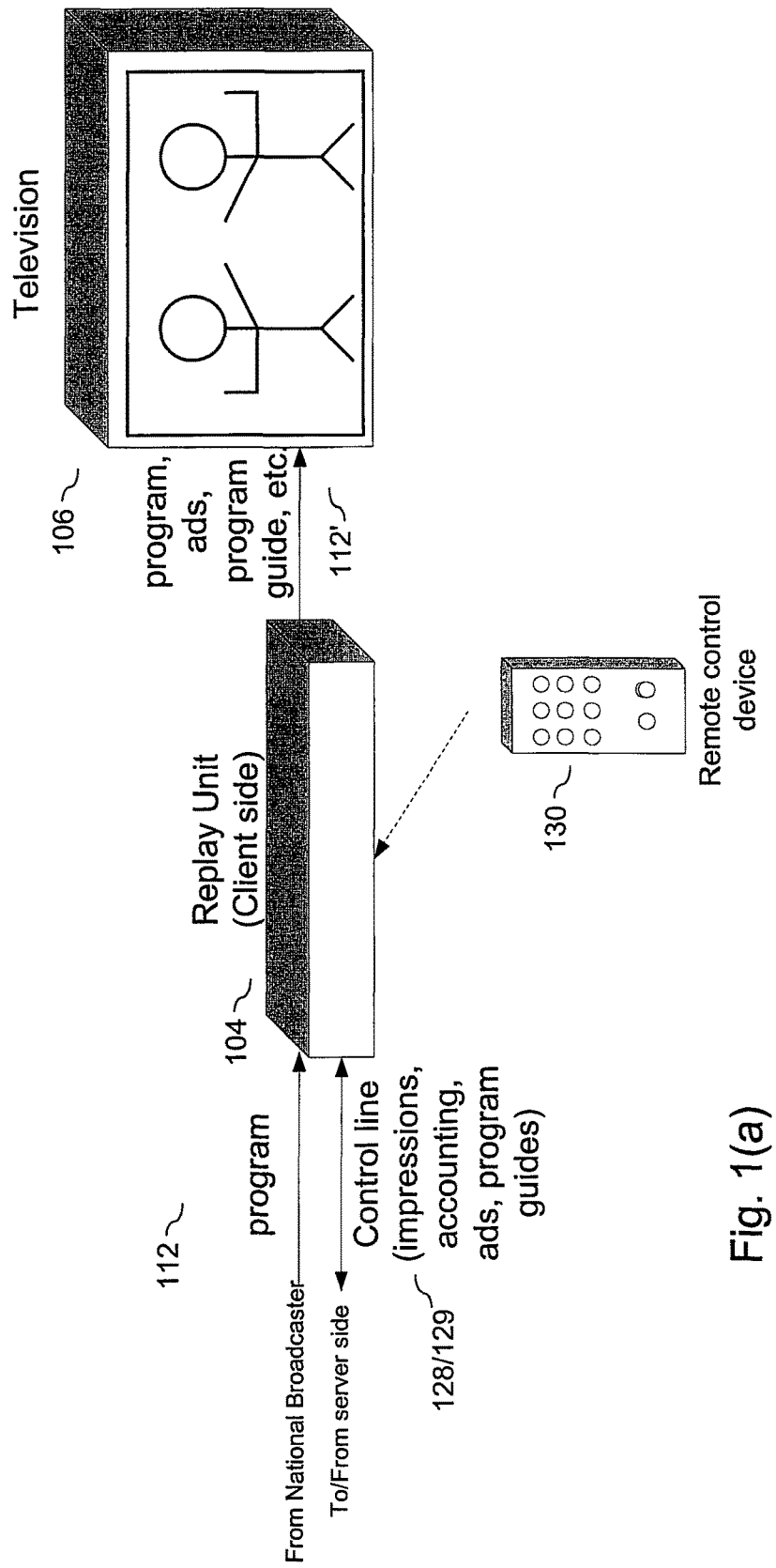
FIG. 1(a) is a block diagram of a video replay system that can include ad placement software in accordance with the present invention.

FIG. 1(a) is a view of a client-side video replay system 104 and a display 106. In the Figure, the program 112 (such as a television program) is received from a broadcaster and is passed to a display (such as a television set) 106, along with other content such as ads and programming guides. The invention can be implemented in a wide range of devices and is not limited to video replay units. The client-side unit 104 contains a storage medium (not shown), such as a hard drive, which is used to store the incoming program signal and other information. The saved signal can then be viewed at a later time or can be viewed immediately from the storage medium. The client-side unit 104 includes a processor and memory (or similar components used to direct the functionality of the unit) and implements the described functions for the particular unit 104. Client-side video replay system 104 can make placement decisions when disconnected from the initial source of ads, such as an ad server.

The client-side video replay system 104 receives control information 128, such as ads and program guides, from a server and sends control information 129, such as ad impressions and accounting information, to the server. It should be understood that the system can receive various types of programming, including but not limited to cable content, television content, high definition TV content, digital TV content, pay per view content, and content broadcast over the Internet. It should also be understood that display device 106 can be any appropriate type of display device, including but not limited to a digital or analog television set, an Internet appliance, a cellular device, or a wireless device. The video replay unit and the display device may be separate (as shown), integrated together, or broken into even more functional units than shown.

It will be understood that one implementation of the video replay system uses a telephone line to implement one or more of control lines 128/129. The information is passed to and from the client side 104 on a regular basis (such as every 24 hours). Thus, the system downloads ads from the server relatively infrequently. In the described embodiment, the system receives information over a telephone line and receives daily all the ads it is going to place for the next 24 hours. Other implementations use an Internet connection as control lines 128/129 and connect regularly or on a more frequent basis.

FIG. 1 (a) also shows a remote control device 130, which is used to control the video replay system. In other embodiments, the system is controlled, for example, over the Internet or by way of controls on the client-side unit 104 itself.

2. Client-Side Video Replay System a. Ad Placement Engine

The primary responsibility of an ad placement engine in accordance with the described embodiments is evaluation, placement, and logging of advertising placement on its individual video replay system. In a described embodiment, a software application requests an ad (or indicates the existence of an ad opportunity). These ads may be, for example, ads displayed during a user-initiated pause in the displayed video stream. Other types of ads include main ads to be placed in a main menu of the video player and ads to be placed in banners or in areas of the display reserved for ads. The described embodiments of the present invention can be used in any client side element with any software application that places ads in an appropriate location and circumstance.

The described embodiments decide which ads to place based on factors such as the context, history, user profile, and constraints specific to each ad. One example of user context might include the program currently being viewed by the user. It should be noted that the user may have been viewing this current program for any previous amount of time (hours, minutes, or seconds). In some implementations, ad placement may occur after a user's initial request for a video program or other content.

Figure 1C:
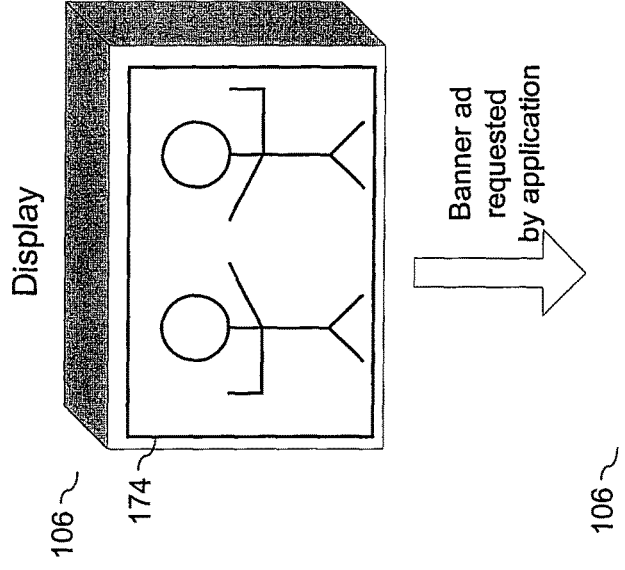
FIG. 1(c) is an example of a video replay system displaying a banner ad.
Figure 1B:
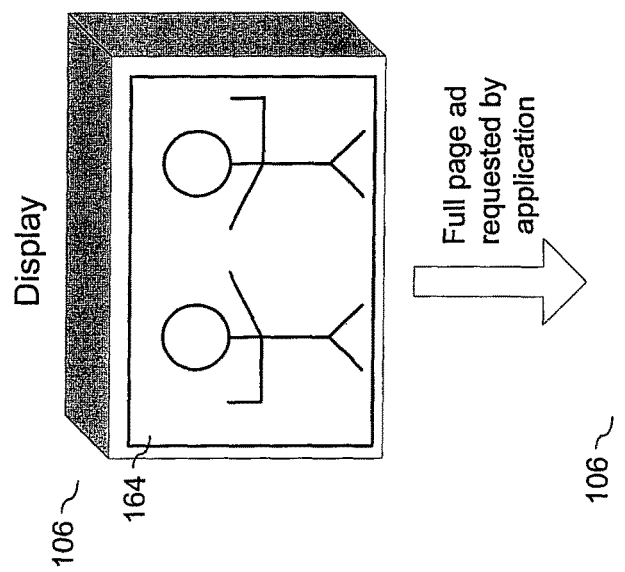
FIG. 1(b) is an example of a video replay system displaying a full page ad.

FIG. 1(b) is an example of a video replay system displaying a full-page ad. In the example, display 106 in a video replay system is caused to display the current program 164, which can either be a program currently being received by the system or a program received previously. At some point in time, in this example, a software application that controls the display decides to display a full page ad. As described below in detail, the application requests an ad from a dynamic ad placement engine and displays the resulting ad 166 on the display 106. It is important to note that, in the displayed embodiment, the application's request for an ad is decoupled from the user's request for content. For example, the user may have watched the same program/content for several hours, but when he pauses the program to get a snack, the application may decide to request and display a full page ad as shown. In contrast, the user may channel surf all night, changing the programs displayed on display 106 every few minutes. In certain implementations, the user's actions may trigger a request for an ad and in other implementations, a night of channel surfing will not trigger such as request. Request and display of ads is under control of the controlling application. In some embodiments, an ad is requested as soon as the user presses the pause button. In other embodiments, for example, the ad is requested a predetermined amount of time after the user presses the pause button.

FIG. 1(c) is an example of a video replay system displaying a banner ad 176. A banner ad can be displayed in a predetermined portion of the display or in a portion of the display decided by the application controlling the display. In one embodiment, banner ad 176 is displayed along with the program guide displayed on display 106. In other embodiments, banner ad 176 is displayed as part of a "zone" guide display or next to the program content.

Figure 2:
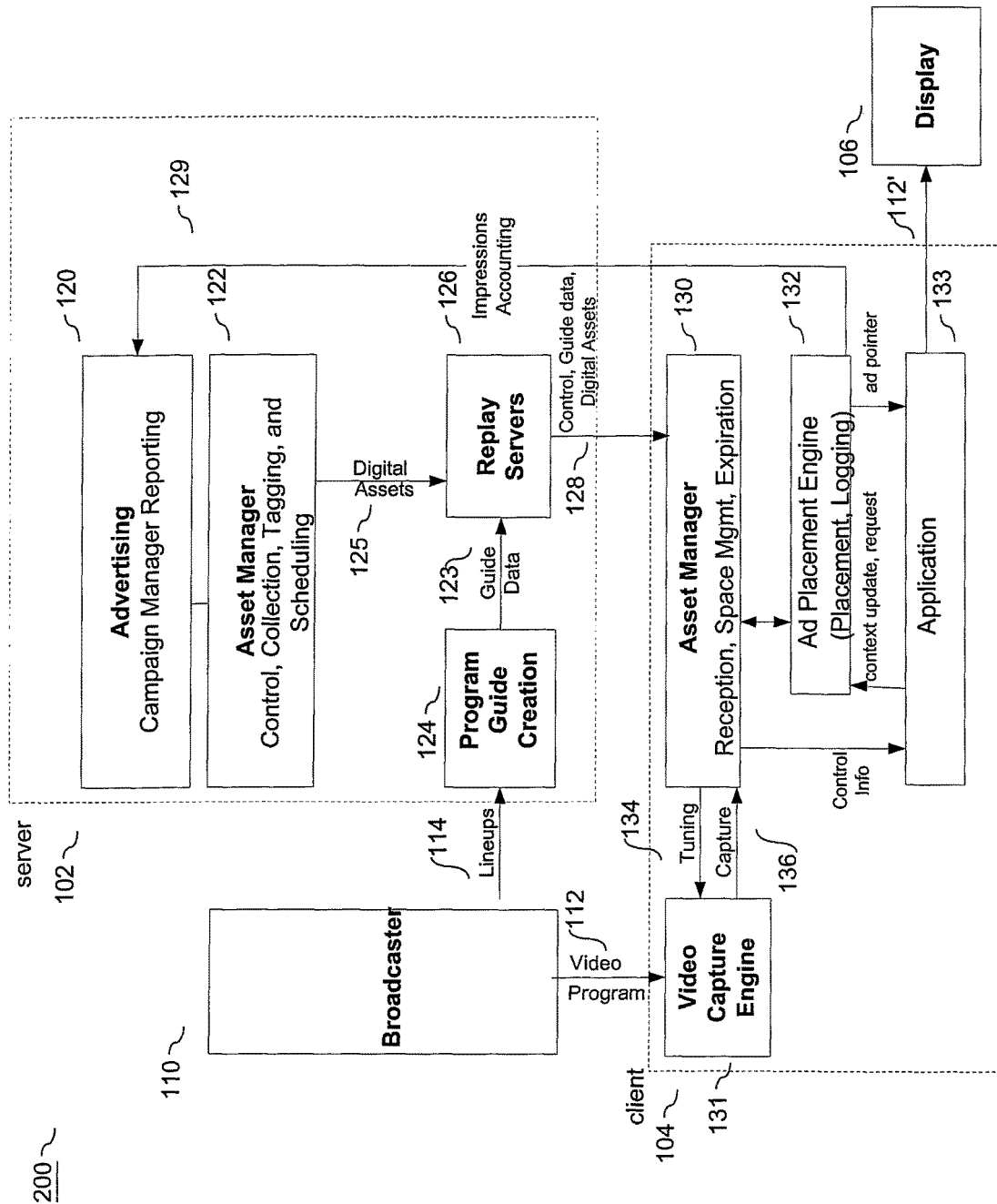
FIG. 2 is an overview of a video replay system.

FIG. 2 is a block diagram of a server side and a client side of an example video replay system 200 that can include ad placement software in accordance with the present invention. The figure includes a server 102, as well as client 104 and display 106. The system receives signals from a broadcaster 110, such as a television, cable, or pay-per-view broadcaster that broadcasts one or more programs 112 (such as a video broadcast) to a video capture engine 131 on the client side 104. The video capture engine 131 contains a tuner (if needed) to select which of the possible programs 112 to receive and a storage medium (such as a hard drive) that retains the program 112 as it is received. The user can then choose to either display the program 112 as it is being received or save the program 112 for playback at a later time (or both).

Server 102 includes an advertising section 120 that allows a user to create ad campaigns, perform ad management, and perform advertisement tracking (both placement and viewing tracking); an asset manager 122 that manages distribution of ads, tracking information, etc; a program guide creation section 124, and one or more replay servers 126. Lineups 114 of programs to be broadcast in the future are sent to program creation guide 124, which creates program guide data 123 that is passed to the client side 104 via replay server 126. Asset manager 122 collects, tags, and creates scheduling rules for ads (digital assets 125). Digital assets 125 (such as ad content and ad rule sets) are passed to the client side 104 for display in accordance with the present invention. A broadcast schedule (such as scheduling rules) is passed to the client side 104 for use in electronic programming guide applications. As discussed below, some of the electronic programming guide data may also be used in guiding placement of ads. Information passed to client side 104 from replay server 126 is designated as reference numeral 128.

The client 104 includes the video capture engine 131, which passes captured programming content to asset manager 130. Asset manager 130 also passes tuning data to video capture engine 131, indicating when the user has, for example, changed the television or cable channel.

The client side 104 also includes an ad placement engine 132 that communicates with asset manager 130. Ad placement engine 132 is described in detail below. One or more applications 133 communicate with ad placement engine 132 to register ads. It will be understood that the described system is but one possible example of a video replay system incorporating the present invention.

Figure 3:
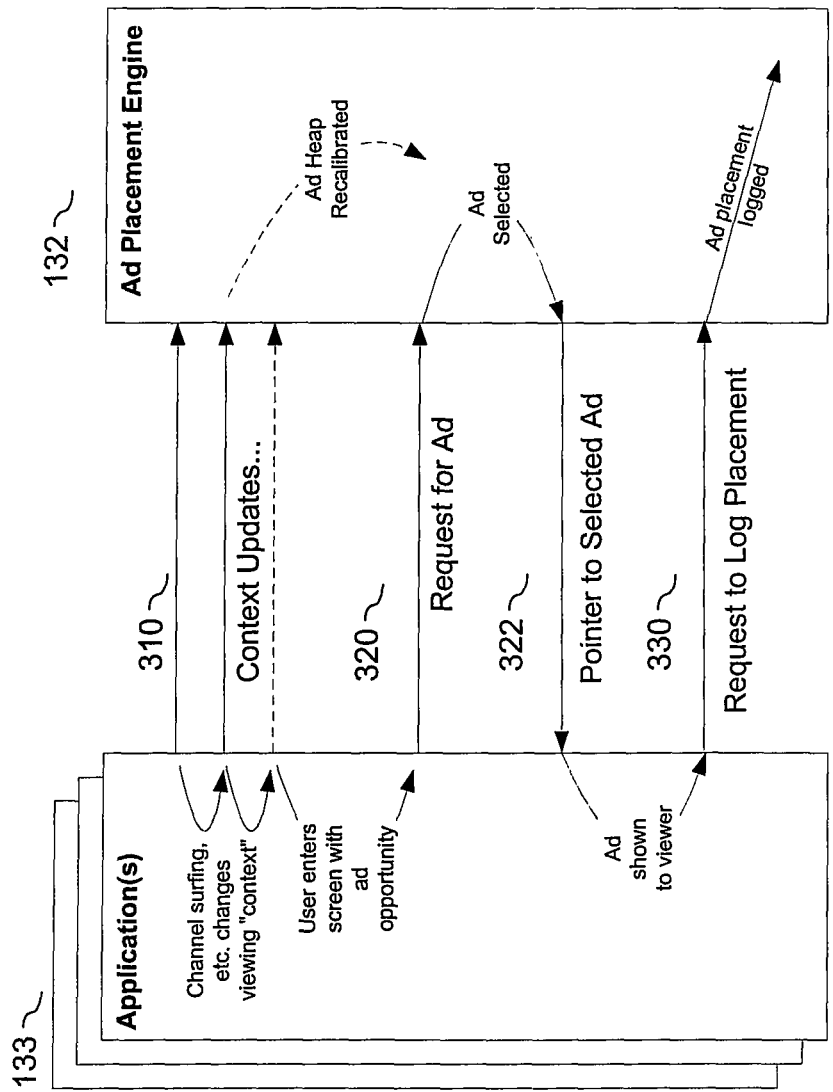
FIG. 3 is a diagram of interaction between an application and ad placement engine in a video replay system.

FIG. 3 is a diagram of interaction between one or more software applications 133 and ad placement engine 132 in a client-side video replay system 104. It should be understood that the application 133 can be any appropriate application, including but not limited to an electronic programming guide or video viewed by a user. The described applications 133 have the ability to detect a change of viewing context in the system. For example, the user might change the television channel so that a new program is displayed on display 106. This channel change causes a change in viewing context.

When application 133 detects a viewing context change (or soon thereafter), it sends a context update 310 to ad placement engine 132. Ad placement engine 132 updates its context information as discussed below. (For example, the global parameter g_programtitle as shown in FIG. 5 might be altered to reflect the new program title). In the Figure, zero or more viewing context changes can occur before a request for an ad is made. If, for example, the user is channel surfing, many frequent context updates might be made before a request for an ad is made. If the user watches the same program for several hours, many requests for ads might be made, but no context updates might occur. The context changes can include, but are not limited to context changes resulting from the user changing the channel on the video replay system. Other context changes include changes in time (i.e., time passing) and program changes within a channel.

Figures 7A, 7B, 8:
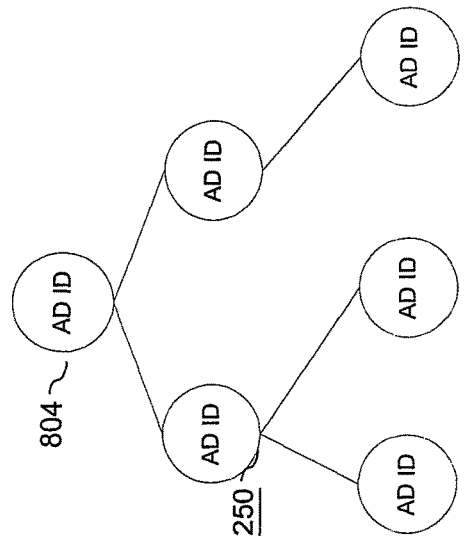
FIG. 7(a) shows the example rules of FIG. 5 in table form.
FIG. 7(b) shows an example trigger table, including the trigger for the ad of FIG. 5.
FIG. 8 shows an example of a heap data structure.

As shown in FIG. 3, when ad placement engine 132 receives a context update, it recalibrates an order and weight of ads in a heap data structure (see FIG. 8). This step may also add ads to or delete ads from the heap. In the described embodiment, this step constitutes recalibrating the ad heap as described below in connection with FIG. 9(b).

When a screen with an ad opportunity is to be displayed, application 133 requests 320 an ad from ad placement engine 132. In the described embodiment, an application might request an ad in several situations. For example, the user can choose to "pause" programming that he is currently viewing. Because the programming is "spooled" in video capture engine 131 (or was previously stored in video capture engine 131 and is now being replayed), the video capture engine 131 saves the incoming programming signal during the period that the display is "paused." In the described embodiment, the pause function begins to display an ad for a predetermined period of time after the pause occurs. For example, the ad may be displayed 10 or 20 seconds after the display has been paused. In the described embodiment, the ad displayed in pause mode is generally a full-page ad (see FIG. 1(b)), although it could also be another appropriate type of ad. Thus, the user no longer sees the paused content on display 106 and begins seeing the ad. In the described embodiment, the user can indicate that he does not want to see pause ads—either as a global indication that affects all pause ads, or on a case by case basis, where the user cancels individual pause ads. Certain applications also allow the user to set the amount of time that passes before pause ads are displayed in pause mode.

After an ad is selected, it is returned 322 to the application 133, where it is displayed.

In another embodiment, the application interjects ads into predetermined areas of the electronic programming guide (see, for example, FIG. 1(c)). Thus, whenever the application is going to display the electronic programming guide, it requests an ad and inserts the ad into the predetermined area of the electronic programming guide. This ad may be a fullscreen ad or a banner ad that does not fill the whole screen. For example, the ad may be a banner ad inserted by the application into a "zone" page that displays various categories or "zones" of programming (news, sports, content from predefined licensing partners, etc). It should be understood that a dynamic ad placement engine in accordance with present invention can be used to supply ads to any appropriate application. Moreover, in certain embodiments, the application 133 and the ad placement engine 132 are merged and are not separate modules.

After an ad is successfully displayed, application 133 sends a request 330 to log placement of the ad.

Figure 4:
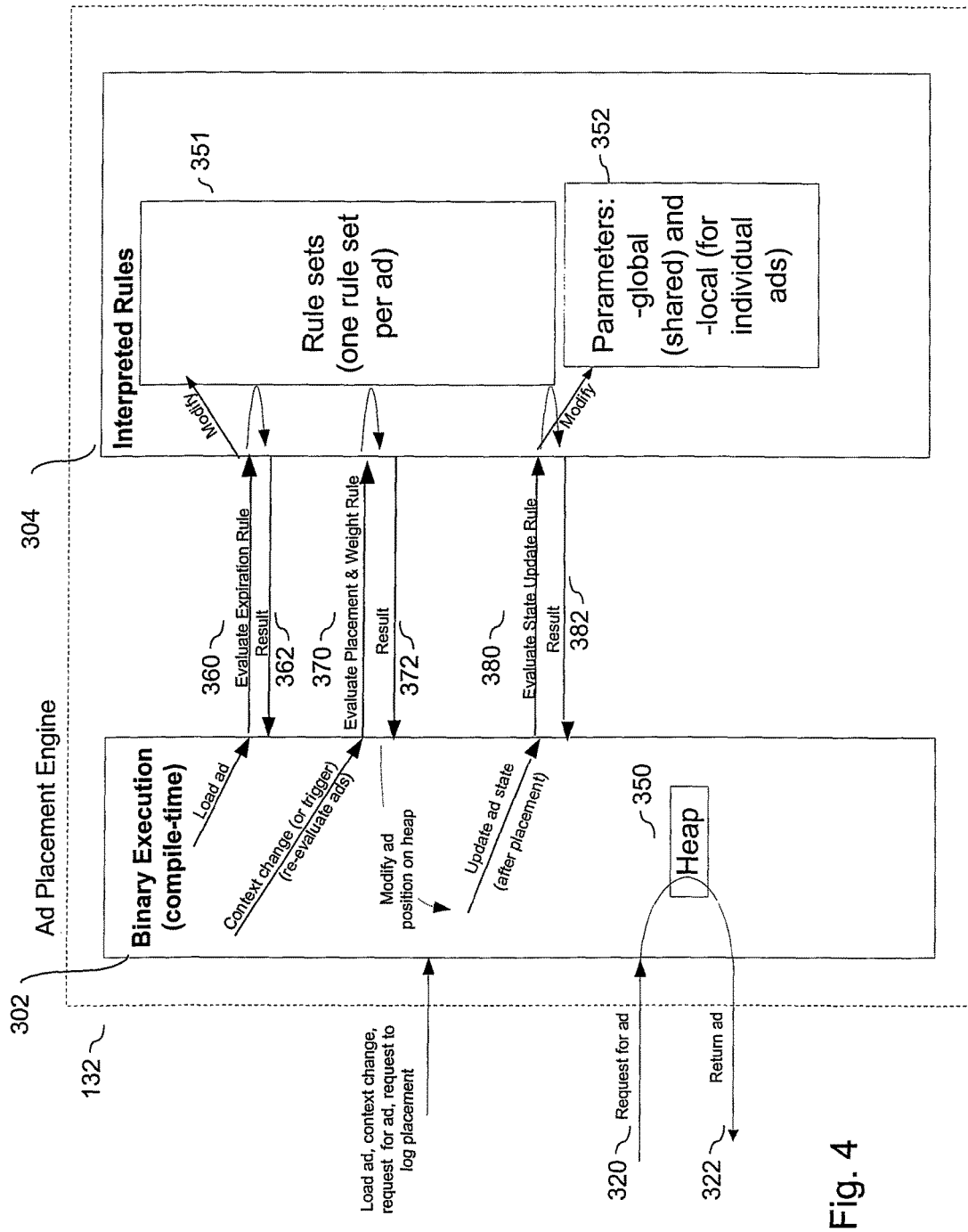
FIG. 4 is a block diagram of elements in the ad placement engine of FIG. 3.

FIG. 4 shows detail of ad selection. In response to a request for an ad 320, ad placement engine 132 selects an ad from the top of an ad heap 350 and returns 322 the selected ad to the requesting application where it is displayed in an appropriate manner. As shown in FIGS. 3 and 4, the heap 350 may have been recalibrated between the time a context update 310 was received and an ad request 320 was received. Ad placement engine 132 preferably is not directly responsible for user-interface (UI) functionality, such as ad rendering or user navigation. On the other hand, ad placement engine 132 makes informed decisions based on the current application context. The fact that the context update information 310 is exchanged in advance of a request for the ad allows the ad placement engine more time to select an optimal ad. When the user finally surfs to an appropriate screen location for ad placement (as determined by the application), the application 133 requests an ad from the ad placement engine 132. When an ad placement request 320 occurs, the ad placement engine 132 consults it ad heap 350 and returns the ad at the top of the heap (or the ad that is highest weighted thus far if it runs out of time in systems requiring an ad to be returned within a maximum time frame). The information returned in response to an ad request contains enough information that the application can display the ad.

Lastly, after the ad has been displayed, application 302 sends logging information 330 to ad placement engine 132 to inform ad placement engine 132 that the ad has been displayed. Ad placement engine 132 logs the logging information and eventually passes the logging information to server 102.

FIG. 4 is a block diagram of elements in ad placement software 132 of FIG. 3. These elements include executable ad placement software 302 and interpreted runtime rules 304. The executable ad placement software 302 contains the runtime functionality of the ad placement software 132. The rules 304 are executed by a rule interpreter at runtime. In the described embodiment, the entry and exit points for rule evaluation are known and fixed at compile time of software 302. For example, the weight afforded a particular ad may be determined by a rule executed at runtime and, therefore, be known only at run-time, while the timing and frequency of the evaluation of the weight determination rule is performed only as determined at compile-time of software 302. Additionally, data structures that are used to prioritize and manage the ads (e.g., the heap 350) exist in the executable domain 302. The mix of executable/binary functionality and interpreted rules in the described embodiment provides a combination of both flexibility and performance. Other embodiments may use other combinations of binary and/or interpreted software. FIG. 4 is provided by way of example only.

In this embodiment, ads maintain their own state (for example, through local parameters discussed below). Rules for an ad reference that ad's local state, as well as global context parameters, permitting some flexibility in the values returned by the rule.

When a new ad is loaded from server 102, executable ad placement software 302 loads the ad control file containing the rule set that describes the ad and stores it as a new rule set in rule sets 351 on the executable side. In certain embodiments, ads have a rule that determines the ad's expiration date. For each ad, executable ad placement software 302 evaluates the interpreted rules 304 to determine whether an older version of the loaded rule has expired 360. If the older version of the ad has expired, its rule set is removed from the system. In any case, the new rule set for the new ad is stored in rule sets 351. A status is returned 362 from the expiration request.

When a context change is received (or a trigger event occurs as described below), the placement and weight of the ads are reevaluated 370 in accordance with the placement and weight rules of the respective ads. A placement and weight result is returned 372 for each ad and the position of the ads in the heap are modified accordingly.

When an application indicates that it has placed an ad, a state update is sent to interpreted rules 304 so that the local parameters of the rule set for the ad can be updated. A status of the update is returned 382.

b. Example Ad Control File

FIG. 5 is an example rule set that comprises an ad control file. Each ad has an associated ad control file. An ad control file is the unit sent to client 104 and defines the appearance, placement, and other rules associated with an ad. The example is encoded in XML format, although any appropriate format will suffice. Each rule 502-532 has a parameter name, type, and value. Note that the rules whose names start with "exp" and "stmt" reference both local parameters for the ad and to global parameters (discussed below.) The rules whose names start with "1_*" define local parameters. Each rule evaluates to a value of the type defined in the rule (value32, string, etc).

As shown in FIG. 5, the name space includes <parameter, value> pairs. Parameters can be one of several types, including string, int, floating point. In a preferred embodiment, the parameters are stored on disk, which is memory efficient, but slow. Because the decision as to ad placement is decoupled from the context change and does not have to be performed quickly, the slow access due to storage of the parameters on disk is acceptable. Other embodiments may store parameters in memory.

c. Ad Parameters

FIG. 6 shows examples of types of ad parameters that are referenced in the rules. Global and context parameters (such as time and day of week, genre, and channel) are updated asynchronously to ad placement. Local ad parameters (such as impressions and "previous/last placement") are updated following ad placement.

d. Data Structures

FIG. 7(a) shows some of the example rules of FIG. 5 in table form as they might be stored in interpreted rules software 304. Any appropriate manner of storing parameters, rules (here, a type of parameter), and triggers may be used to implement the present invention.

FIG. 7(b) shows an example trigger table, including the trigger parameter for the ad of FIG. 5. In this example, the trigger is TOD (time of day). Whenever the global TOD parameter is updated, the placement value of the ad 1025 is re-evaluated. It should be noted that not all ads have an associated trigger. Some ads have more than one associated trigger.

FIG. 8 shows an example of a heap data structure. As known to persons of ordinary skill in the art, a heap is a data structure in which the children of a node are guaranteed to have a lower priority than the parent. In the present case, this means that the node at the top of the heap 350 has a highest placement priority and is the ad that should be placed next in response to an ad request. Note that, in a preferred embodiment, the heap is updated after a system context change. However, when an ad request is received by the ad placement engine, the heap is already ordered such that the node on the top of the heap corresponds to the ad that should be placed next and no additional work must be performed on the heap in response to an ad request. Thus, the ad placement engine's response time to an ad request can be extremely fast.

In the described embodiment, heap 350 is ordered according to the following formula for each ad:

Placement value*weight.

Thus, each ad has a placement value as defined by the ad's placement value rule. Some ads have weights, as defined by one or more weight rules. Whenever an ad is reevaluated, the ad's placement value is re-determined and multiplied by its weight(s), if any. This may result in ads being added to or deleted from heap. In the described embodiment, if an ad has a placement value of "0" it is moved to the bottom of the heap. Otherwise the ad is placed on the heap 350 in a location in accordance with its weighted placement value.

e. Flowcharts

FIG. 9(a) shows a flowchart of a method performed when a new ad control file is received from the server. When a new ad is received, any triggers of the ad are added to the trigger table. The rules of the new ad are stored. If appropriate, old versions of the rules are replaced.

FIG. 9(b) shows a flowchart of a method performed when a context update occurs. First, the trigger table is checked to determine whether any affected context parameters are triggers for any ads. A placement value and one or more weight values are calculated for the ads.

FIG. 9(b) is a flowchart showing a method performed when context parameters are updated in the system. When a parameter is updated, the trigger table is checked to see if the parameter is a trigger parameter for any ad. If so, the system re-evaluates the placement values of triggered ads in accordance with the placement rules of the ads (this may result in ads being added to the heap). In the example of FIG. 5, the trigger parameter is TOD. Thus, when the global TOD parameter is updated, as it is periodically, the placement rule and weight is determined for the triggered ad having ad_id 1025 and the ad is added to its proper location in heap 350.

FIG. 9(c) is a flow chart showing a method for selecting an ad in response to an ad request. In the described embodiment, the ads in heap 350 have already been ordered for the current context. Thus, the top ad is popped from heap 350 and returned as the ad to be displayed. In certain embodiments, local variables of the popped ad are re-evaluated at this point Once an assurance is received that the ad was displayed, the placement value (and weight) of the ad is recalculated and the ad is placed back on the heap as shown in FIG. 4. In the example, the weight2 value will force the ad to be moved to the bottom of the heap. Thus, if the context is not updated for a long period of time, all the ads on the heap will be displayed in a round robin manner as each is forced to the bottom of the heap after it is displayed.

f. Placement Rules

The following paragraph discusses the example placement rule exp_placement. Each ad in the system has an associated ad placement rule. This placement rule will be delivered to the client through the same mechanism that other ad-specific parameters are delivered. The rule is a Boolean construct, with the following syntax:
Expression: Operand|Operand Binary-op Operand
Operand: Number|String|NULL|Identifier|"("Expression")"
String: """"ASCII-characters"""""
Number: Integer-constant|Floating constant
NULL: "N" "U" "L" "L"
Binary op: "+"|"−"|"/"|"*"|"="|"!="|"<"|">"|">="|"<="|"|"|"&&"

An operand that references an undefined parameter evaluates to 0 or " ", depending on the context.

In the described embodiment, placement rules can determine the placement of an ad in accordance with one or more parameters relating to context (for example, program title); history (for example, number of total occurrences ever displayed on this system); user profile (for example, a viewer category number might be pushed to the device from a server or might be derived); and frequency (for example, time in epoch seconds of last ad placement).

Example Placement Rules:

```
/* viable if time has exceeded 968630400 (epoch seconds) */
exp_placement = g_time>=968630400
/* viable if time of day is between 79200 and 75540 seconds */
exp_placement = (79200<=g_tod)&&(g_tod<=75540)
``` g. Ad Weighting

The evaluation of a placement rule for an ad is a value that is used by default to weight the placement of the ad among all other currently viable ads.

Note that this functionality could be embedded into the placement rule itself with no change in logic, but for the sake of clarity may be separated into separate weighting evaluation. This separation also models the fact that the "business rules" or placement logic may be defined in a separate phase of the ad sales process than the weighting. Weighting will most likely be defined as part of the trafficking or post-sales process.

Thus, the separation into two parameters allows the placement and weighting logic to be constructed during separate phases of the sales process.

Example Weighting Rules:

```
/* a constant weight throughout the life of the campaign */
exp weight =40
/* an increasing weight proportionate to time passed */
exp_weight = 40 + (((g_time − 968630400)/2419200)*20)
``` h. Expiration Rules

In the described embodiment, expiration rules are evaluated at load time and before and after placement.

The same namespace and syntax used for a placement rule can be used to implement an expiration rule. An expiration rule is evaluated whenever the ad list is rehashed and periodically during operation. An evaluation that yields non-zero indicates that the advertisement has expired. The expiration rule will be delivered as a parameter called "rule expiration."
Example Expiration Rules:

```
/* ad is expired if occurrences exceeds 50 or a time is passed */
exp_expired = ((1_occs>=50)||(g_time>=969580800))
``` i. State Update Rules

Every ad will store a limited number of local parameters that are used in the evaluation of the ad's placement, weighting, and expiration rules. Following placement of an ad, any of these parameters can be updated according to a set of state update rules. The syntax for these rules is:
Assignment-list: Assignment-statement Assignment-list
Assignment-statement: Identifier "=" Expression ";"
Note: Expression is defined as above in the Placement Rules section.
The state update rule is evaluated once following each successful placement of the ad. Other embodiments implement several state update mechanisms, including one for successful placement, one for failed placement, etc.
Example State Update Rules:

```
/* bump local count of occurrences */
stmt_winner update = 1_occs=1_occs+1;
/* set time and occurrence count of placement */
stmt_winner update = 1_last_time=g_time; 1_last_occ=g_occs
``` j. Round-Robin Placement with Priority

In the described embodiments, an order of priority rotates through ads in round-robin fashion. An ad's position in rotation should be preserved through reboots. Deletion, substitution, or addition of an ad does not reset its position in the rotation. As described above, this order of rotation is currently implemented using the weight2 parameter which forces an ad to the bottom of the heap 350 after the ad is placed.

k. Other Rules in the Example

The following paragraphs discuss other rules in the example of FIG. 5.

Ad_id 502: an identifying number for this ad.

Ad_rev 504: a revision number for this ad. This parameter allows an ad to expire if other ads with the same name have a higher ad rev value.

Ad_type 506: This specifies a type of ad request for which this ad will be placed. For example, this ad will only be placed when an application requests a "pause" ad. In the described embodiment, pause ads are of a size to fill the entire screen (in contrast to banner ads, which are smaller). Other types include banner ads and ads appearing on a zone page, next to a type of programming zone.

Ad_pools 508: This specifies a type of programming for which the ad will be placed. For example, the value "9002" may indicate that the ad will be placed only for science fiction programming. Pools may also reflect geographic groups.

Ad_files 510: This specifies one or more "collateral" files needed to display the ad. For example, a collateral file may include a bitmap graphic needed to display the ad. Collateral files can also be broadcast separately form the ad control file.

Ad_triggers 512: as discussed above, the parameter TOD is a trigger for this ad. Any parameter can be a trigger.

Ad_genre 514: currently unused

Exp_placement 516: placement rule for this ad. This ad is placed when the expression yields a value of true. It is evaluated when ever the context changes.

Exp_expired 518: expiration rule for this ad.

Exp-weight 520 and Exp_weight2 522: The first weight is used to weight the placement value for this ad before the ad is placed in the heap. The second weight is used, in this embodiment, to force the ad to go to the bottom of the heap after it is displayed. This helps in aiding a round robin placement order.

Exp_winner 524: This string is passed to the application to tell it which file to display representing the ad.

Stmt_winner_update 526: This causes the specified local variables to be updated when the ad is popped off the stack.

Exp_winner log 528: This string gets written to the log when the ad is displayed.

Ad_preserve list 530: This indicates local parameters that are to be kept for this ad.

L_occs: L_last_time: L_last_occ 532: These are local parameters used for this ad.

From the above descriptions, it will be apparent that the present invention disclosed herein provides a novel and advantageous method and system for assessing which ads to place on a client side video replay engine. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

We claim:

1. An apparatus comprising:

an asset manager of a client-side machine configured to receive a plurality of advertisement (ad) control files, wherein each ad control file is associated with a respective ad of a plurality of ads and at least one of the ad control files includes a trigger parameter;

a storage medium storing the plurality of ads, and a trigger table including multiple trigger parameters associated with one or more of the ads, wherein each ad of the plurality of ads is associated with a respective placement value and at least one of the ads is associated with a respective weight value, and wherein at least one of the trigger parameters within the trigger table is from the at least one of the ad control files including the trigger parameter;

an ad placement engine of the client-side machine in communication with the asset manager of the client-side machine and configured to use, for each ad that is associated with a respective weight value, a weight rule, within an ad control file associated with the ad, to determine the respective weight value associated with the ad, wherein the weight rule of the at least one of the ad control files includes an equation for calculating a weight value that increases proportionately to time passed, and wherein the ad placement engine is configured to re-evaluate the respective placement value of each ad of the plurality of ads to obtain a re-evaluated placement value and to re-evaluate an order of the plurality of ads so as to determine a next ad to be displayed; and a display controller in communication with the ad placement engine of the client-side machine and configured to provide a display with the next ad to be displayed responsive to an ad request, wherein the display of the next ad is delayed for a predetermined time period if a pause request is detected, wherein re-evaluation of the order of the plurality of ads includes: (i) for each ad associated with a respective weight value, multiplying the re-evaluated placement value associated with that ad by the weight value associated with that ad so as to determine a weighted placement value for that ad, and (ii) placing each ad associated with a weight value on a heap data structure that indicates the order of the plurality of the ads in accordance with the weighted placement value for that ad, wherein the next ad is displayed based on a position in the heap data structure responsive to the ad request without performing another re-evaluation of the order of the plurality of ads after the ad request is received, and wherein the re-evaluation of the order of the plurality of ads occurs at least in response to a detection of a system context change that includes a channel change, a time of viewing a program, a program changing on a particular channel, or a combination thereof.

2. The apparatus of claim 1,
wherein the display controller is configured to check the trigger table to determine a parameter updated by the apparatus to obtain an updated parameter, is a trigger parameter associated with an ad of the plurality of ads, and
wherein the re-evaluation of the respective placement value of each ad occurs in response to the determination that the updated parameter is the trigger parameter associated with the ad of the plurality of ads.

3. The apparatus of claim 1, further comprising:
a video capture engine configured to receive signals from a broadcaster that broadcasts a program,
wherein the video capture engine includes a tuner to select the program to receive from the broadcaster.

4. The apparatus of claim 3,
wherein the apparatus is configured to enter a pause mode while a selected program is output to the display,
wherein the display controller provides the display with the next ad during the pause mode so that the display shows the next ad instead of the selected program.

5. The apparatus of claim 1,
wherein the display controller is configured to request the ad placement engine to log placement of the ad after the ad is displayed, and
wherein the ad placement engine is configured to log placement of the displayed ad in response to the request to log placement of the ad.

6. The apparatus of claim 1, wherein the asset manager receives the plurality of ad control files from a server machine.

7. The apparatus of claim 1, further comprising: a display configured to display the next ad, wherein the ad placement engine distinguishes between the channel change and channel surfing, and wherein the system context change causing the re-evaluation of the order of the plurality of ads is not based on the channel surfing.

8. The apparatus of claim 7, wherein the apparatus is integrated together with a cellular device.

9. The apparatus of claim 1, wherein the trigger parameter is selected from the group consisting of a parameter indicating a time of day, a parameter indicating a day of week, a parameter indicating a day of month, a parameter indicating day of year, and a parameter indicating a month of year.

10. The apparatus of claim 1,
wherein a given ad control file includes a rule set that describes the ad associated with the given ad control file,
wherein the rule set of the given ad control file includes a rule for determining an expiration date of the ad associated with the given ad control file, and
wherein the rule for determining the expiration date includes an equation with a variable time parameter.

11. A system comprising:
a client machine,
wherein the client machine is configured to receive, from a server machine, first control information including a plurality of advertisement (ad) control files,
wherein the client machine includes (i) a storage medium storing a plurality of ads and a trigger table including multiple trigger parameters associated with one or more of the ads, (ii) an ad placement engine, (iii) a first asset manager configured to receive the first control information including the plurality of ad control files, and (iv) a display controller configured to provide a display with a next ad to be displayed,
wherein each ad control file is associated with a respective ad of the plurality of ads and at least one of the ad control files includes a trigger parameter,
wherein each of the ads is associated with a respective placement value and at least one of the ads is associated with a respective weight value,
wherein at least one of the trigger parameters within the trigger table is from the at least one of the ad control files including the trigger parameter,
wherein the ad placement engine is configured to use, for each ad that is associated with a respective weight value, a weight rule within an ad control file associated with the ad to determine the weight value associated with the ad,
wherein the weight rule of at least one of the ad control files includes an equation for calculating a weight value that increases proportionately to time passed,
wherein the ad placement engine is configured to re-evaluate the placement value of each ad of the plurality of ads and to re-evaluate an order of the plurality of ads so as to determine the next ad to be displayed, and
wherein re-evaluation of the order of the plurality of ads includes: (i) for each ad associated with a respective weight value, multiplying the re-evaluated placement value associated with that ad by the weight value associated with that ad so as to determine a weighted placement value for that ad, and (ii) placing each ad associated with a weight value on a heap data structure that indicates the order of the plurality of the ads in accordance with the weighted placement value for that ad, wherein the next ad is displayed based on a position in the heap data structure responsive to an ad request without performing another re-evaluation of the order of the plurality of ads after the ad request is received, and wherein the re-evaluation of the order of the plurality of ads occurs at least in response to a detection of a system context change that includes a channel change, a time of viewing a program, a program changing on a particular channel, or a combination thereof.

12. The system of claim 11, wherein the server machine includes an advertising section configured to perform ad placement tracking and ad viewing tracking.

13. The system of claim 11,
wherein the first asset manager is configured to transmit second control information to the server machine, wherein the server machine is configured to receive the second control information transmitted by the client machine, and wherein the second control information includes ad impressions and accounting information.

14. The system of claim 13, wherein receipt of the first control information by the client machine and transmission of second control information by the client machine to the server machine occurs over an Internet connection.

15. The system of claim 11, further comprising: the display configured to display the next ad determined by the ad placement engine.

16. The system of claim 15, wherein the client machine is integrated together with a cellular device.

17. The system of claim 11, wherein the server machine includes a program guide creation section configured to receive program lineups from a broadcaster of programs and to create a program guide for passing to the client machine, wherein the server machine includes a replay server that receives the program guide from the program guide creation section and provides the program guide to the client machine, and wherein the client machine provides the program guide to a display.

18. The system of claim 11, wherein the display controller is configured to send, to the ad placement engine, a context update responsive to a detected change of viewing context, and wherein the ad placement engine is configured to re-evaluate the order of the plurality of ads in response to the context update.

19. An apparatus for displaying an ad by a client-side video replay machine, the apparatus comprising:

means for storing, on the client-side video replay machine, a plurality of advertisements (ads) and a trigger table including multiple trigger parameters associated with one or more of the ads, wherein each of the ads is associated with a respective placement value and at least one of the ads is associated with a respective weight value;

means for receiving a plurality of ad control files, wherein each ad control file is associated with a respective ad of the plurality of ads and at least one of the ad control files includes a trigger parameter within the trigger table;

means for re-evaluating stored ads after a system context change occurs to determine a next ad to be displayed, wherein the means for re-evaluating stored ads uses, for each ad that is associated with a respective weight value, a weight rule within an ad control file associated with the ad to determine the respective weight value associated with the ad, wherein the weight rule includes an equation for calculating a weight value that increases proportionately to time passed, and wherein the means for re-evaluating is configured to re-evaluate the respective placement value of each ad of the plurality of ads and to re-evaluate an order of the plurality of ads so as to determine a next ad to be displayed; and means for controlling a display to display the next ad when the client-side video replay machine encounters an addisplay opportunity, wherein re-evaluation of the order of the plurality of ads includes: (i) for each ad associated with a respective weight value, multiplying the re-evaluated placement value associated with that ad by the weight value associated with that ad so as to determine a weighted placement value for that ad, and (ii) placing each ad associated with a weight value on a heap data structure that indicates the order of the plurality of the ads in accordance with the weighted placement value for that ad, wherein the display is controlled to display the next ad based on a position in the heap data structure responsive to an ad request without performing another re-evaluation of the order of the plurality of ads after the ad request is received.

20. The apparatus of claim 19, wherein at least one of the trigger parameters within the trigger table is from the at least one of the ad control files including the trigger parameter.

* * * * *

UNITED STATES PATENT AND TRADEMARK OFFICE
CERTIFICATE OF CORRECTION

PATENT NO. : 10,380,630 B2
APPLICATION NO. : 14/058393
DATED : August 13, 2019
INVENTOR(S) : Scott A. Rosenberg and Matthew H. Self Page 1 of 1

It is certified that error appears in the above-identified patent and that said Letters Patent is hereby corrected as shown below:

In the Claims

In Claim 19, Column 15, Lines 33-41, Column 16, Lines 1-36 should read:
19. An apparatus for displaying an ad by a client-side video replay machine, the apparatus comprising:
    means for storing, on the client-side video replay machine, a plurality of advertisements (ads) and a trigger table including multiple trigger parameters associated with one or more of the ads, wherein each of the ads is associated with a respective placement value and at least one of the ads is associated with a respective weight value;
    means for receiving a plurality of ad control files, wherein each ad control file is associated with a respective ad of the plurality of ads and at least one of the ad control files includes a trigger parameter within the trigger table;
    means for re-evaluating stored ads after a system context change occurs to determine a next ad to be displayed, wherein the means for re-evaluating stored ads uses, for each ad that is associated with a respective weight value, a weight rule within an ad control file associated with the ad to determine the respective weight value associated with the ad, wherein the weight rule includes an equation for calculating a weight value that increases proportionately to time passed, and wherein the means for re-evaluating is configured to re-evaluate the respective placement value of each ad of the plurality of ads and to re-evaluate an order of the plurality of ads so as to determine a next ad to be displayed; and
    means for controlling a display to display the next ad when the client-side video replay machine encounters an ad display opportunity,
    wherein re-evaluation of the order of the plurality of ads includes: (i) for each ad associated with a respective weight value, multiplying the re-evaluated placement value associated with that ad by the weight value associated with that ad so as to determine a weighted placement value for that ad, and (ii) placing each ad associated with a weight value on a heap data structure that indicates the order of the plurality of the ads in accordance with the weighted placement value for that ad, wherein the display is controlled to display the next ad based on a position in the heap data structure responsive to an ad request without performing another re-evaluation of the order of the plurality of ads after the ad request is received.

Signed and Sealed this
Twelfth Day of November, 2019

Andrei Iancu
*Director of the United States Patent and Trademark Office*